United States Patent [19]

Igarashi

[11] Patent Number: 4,952,040
[45] Date of Patent: Aug. 28, 1990

[54] ILLUMINATION OPTICAL SYSTEM FOR AN ENDOSCOPE

[75] Inventor: Tsutomu Igarashi, Tokyo, Japan

[73] Assignee: Olympus Optical Co., Ltd., Tokyo, Japan

[21] Appl. No.: 324,974

[22] Filed: Mar. 20, 1989

Related U.S. Application Data

[63] Continuation of Ser. No. 210,504, Jun. 23, 1988, abandoned.

[30] Foreign Application Priority Data

Jun. 26, 1987 [JP] Japan ................................. 62-157484

[51] Int. Cl.$^5$ .......................... G02B 3/04; G02B 3/08; G02B 6/00; G02B 23/26
[52] U.S. Cl. .................................. 350/432; 350/96.10; 350/96.24; 350/96.26; 350/448; 350/452
[58] Field of Search .................................. 350/432–435, 350/96.10, 96.24, 96.25, 96.26, 448, 452

[56] References Cited

U.S. PATENT DOCUMENTS

| | | | |
|---|---|---|---|
| 4,266,534 | 5/1981 | Ogawa | 350/437 |
| 4,415,240 | 11/1983 | Nishioka et al. | 350/96.10 |
| 4,575,195 | 3/1986 | Hoogland | 350/432 |
| 4,610,513 | 9/1986 | Nishioka et al. | 350/96.10 |
| 4,662,725 | 5/1987 | Nisioka | 350/432 |
| 4,674,844 | 6/1987 | Nishioka et al. | 350/432 |
| 4,721,372 | 1/1988 | Yokota | 350/414 |
| 4,733,937 | 3/1988 | Lia et al. | 350/432 X |

*Primary Examiner*—Scott J. Sugarman
*Attorney, Agent, or Firm*—Cushman, Darby & Cushman

[57] ABSTRACT

An illumination optical system for an endoscope comprising a light source, and a lens system arranged on the object side of said light source and having at least one aspherical surface, said illumination optical system being so designed as to satisfy the following conditions (1) through (3):

(1) Height of ray h satisfying $d/dh \{\sin A(h)\} < 0$ exists within a range of $0 \leq h \leq r$.
(2) A relation of $\sin A(h_o) \geq 0.3$ establishes for a certain value $h_o$ of h within a range of $0 < h_o < r$ satisfying $d/dh \{\sin A(H_o)\} = 0$
(3) $S < 0.5\, S_o$ This illumination optical system has a wide illumination range and provides favorable light distribution at marginal portion with little loss of light quantity.

19 Claims, 13 Drawing Sheets

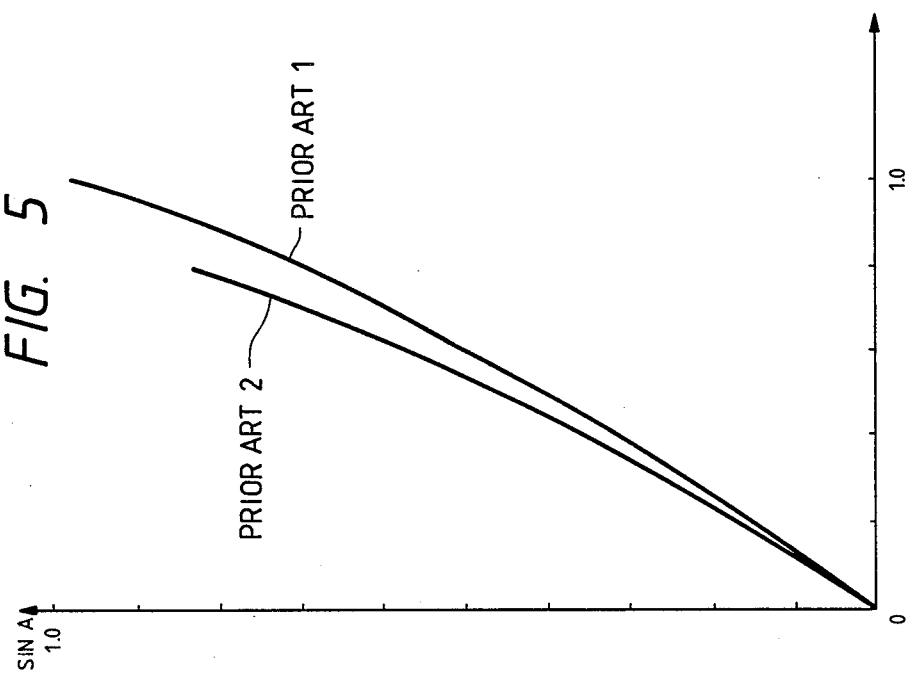
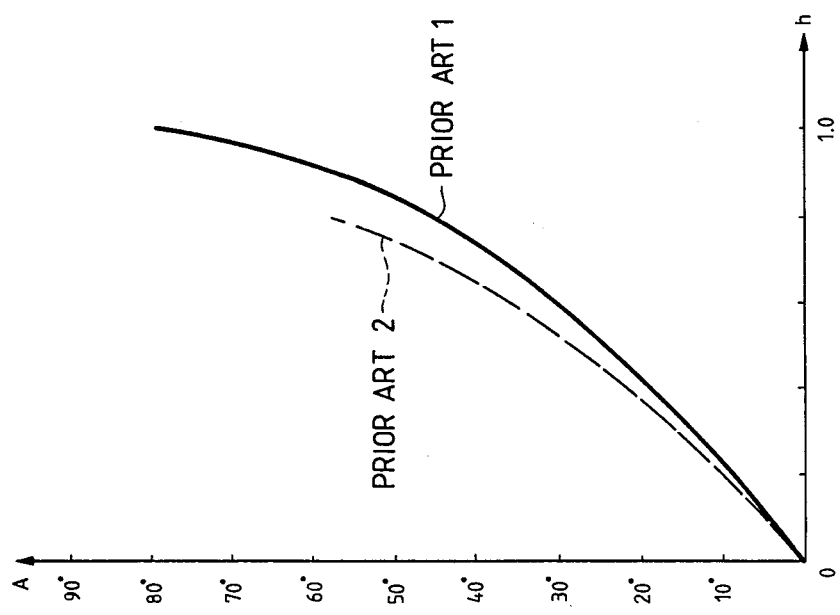

FIG. 28
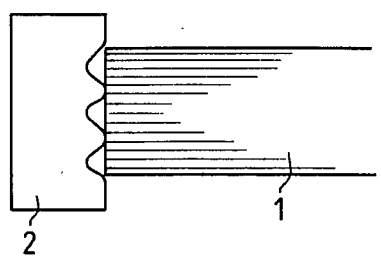
FIG. 29A
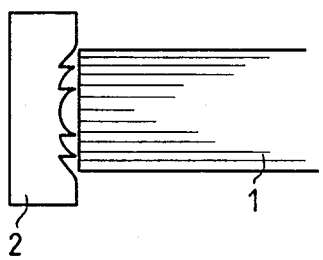
FIG. 29B
FIG. 30A
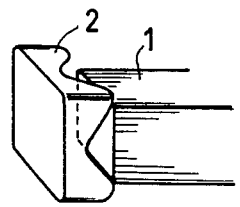
FIG. 30C
FIG. 30B
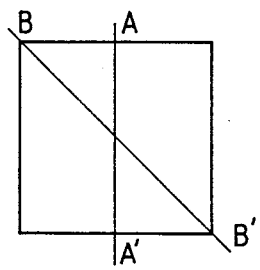
FIG. 30D
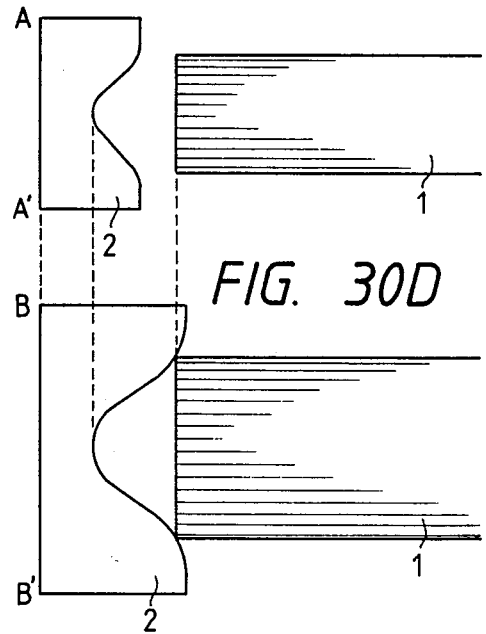

ILLUMINATION OPTICAL SYSTEM FOR AN ENDOSCOPE

This is a continuation of Application No. 07/210,504, filed June 23, 1988, which was abandoned upon the filing hereof.

BACKGROUND OF THE INVENTION (a) Field of the Invention:

The present invention relates to an illumination optical system for an endoscope.

(b) Description of the Prior Art:

Conventionally known illumination optical systems for endoscope generally have the composition shown in FIG. 1. Speaking concretely, an illumination lens 3 is arranged in front of, i.e., on the object side of, the light exiting surface of a light guide 1 so that the light coming out of the light guide 1 is divergent in a wide range. However, the above-mentioned type of illumination optical systems have a drawback described below. That is to say, since the rays emerging at a wide angle from the exiting surface of the light guide are lost due to the scattering on the peripherical inside surface of the illumination lens 3 and directed toward the center of the visual field and the light guide due to the total reflection on the peripherical inside surface of the illumination lens 3, light distribution is made insufficient at the marginal portion of the visual field, thereby making it impossible to provide uniform illumination within a wide range.

Known as a conventional illumination optical system contrived to correct the above-mentioned drawback is the illumination optical system disclosed by Japanese Unexamined Utility Model Application No. 17071/57. This conventional illumination optical system comprises an illumination lens which has a composite surface consisting of a spherical central surface and a peripherical conical surface on the side of the light guide. However, this illumination optical system is incapable of freely controlling light distribution and produces ununiform illumination since the illumination lens has the composite surface consisting of the spherical surface and the conical surface.

SUMMARY OF THE INVENTION

A primary object of the present invention is to provide an illumination optical system for an endoscope usable in a wide angle endoscope, capable of illuminating the visual field brightly even at the marginal portion thereof and assuring small loss of illumination light quantity. The illumination optical system for an endoscope according to the present invention comprises an illumination lens system comprising at least one aspherical lens arranged in front of a light guide or a light emitting element.

The illumination optical system for an endoscope according to the present invention has such a composition, for example, as shown in FIG. 2 wherein an illumination lens 2 designed as an aspherical lens having an aspherical surface on the side of the light guide 1 is arranged in front of the exiting surface of the light guide 1. The shape of the aspherical surface of the aspherical lens 2 is expressed, on the coordinate system shown in FIG. 3, by the following formula:

$$x = \frac{CS^2}{1 + \sqrt{1 - PC^2y^2}} + \sum_{i=1}^{n} B_i y^i \quad (a)$$

wherein C is equal to 1/R (wherein the reference symbol R represents radius of curvature on the vertex of the aspherical surface), the reference symbol Y designates distance as measured from the optical axis (abscissa), the reference symbol P denotes the conic constant and the reference symbol Bi represents the coefficient of aspherical surface of the i'th order.

Further, the illumination optical system for an endoscope according to the present invention comprises an illumination lens system having at least one aspherical surface and is so designed as to satisfy the following conditions (1) through (3):

(1) h satisfying d/dh {sin A(h)} < 0 exists within a range of 0 ≤ h ≤ r.

(2) A relation of sin A(ho) ≤ 0.3 establishes for a certain value ho of h within a range of 0 < ho < r satisfying d/dh {sin A(ho)} = 0

(3) S < 0.5So wherein the reference symbol h represents height of ray or distance as measured from the axis of the light guide to a ray 1 parallel to the optical axis of the illumination lens (hereinafter referred to as the principal ray) in the optical system illustrated in FIG. 2, the reference symbol A(h) designates angle of refraction as measured from the optical axis (abscissa) of the ray 1 having passed through the aspherical lens, the reference symbol r denote radius of a light source (the light guide in the optical system illustrated in FIG. 2), the reference symbol $h_o$ represents height of ray when sin A(h) has a maximum value (the largest value when sin A(h) has two or more local maximum values), the reference symbol S designates area of the light source satisfying |A(h)| ≤ 15° and the reference symbol So denotes total area of the light source. In addition, A(h) has the positive sign when the principal ray having passed through the illumination lens advances in the direction not intersecting with the optical axis.

Now, significance of the above-mentioned conditions (1) through (3) will be described. In the conventional optical systems having the composition shown in FIG. 1 and the numerical data shown below, relations between height h of incident ray and angle of refraction A on the illumination lenses can be graphically illustrated as shown in FIG. 4. In addition, the height of ray h is normalized to r in FIG. 4 through FIG. 7 so as to set the maximum value of h at 1.

Conventional example 1

| | | |
|---|---|---|
| $r_1 = \infty$ | | |
| $d_1 = 0.4545$ | $n_1 = 1.883$ | $\nu_1 = 40.78$ |
| $r_2 = 1.1818$ | | |

Conventional example 2

| | | |
|---|---|---|
| $r_1 = \infty$ | | |
| $d_1 = 0.4545$ | $n_1 = 1.883$ | $\nu_1 = 40.78$ |
| $r_2 = 1.045$ | | |

In these conventional examples, the angles of refraction A(h) are abruptly enlarged as height h of ray increases as shown in FIG. 4. Accordingly, intensity of the principal ray is lowered and light distribution is degraded at the marginal portion of the visual field of the endoscopes. The light distribution at the marginal portion of the visual field can be improved by increasing curvature of the spherical surface so as to widen the angle distribution of the rays emerging from the individual fibers after they have passed through the illumination lens. However, it is not preferable to increase curvature of the spherical surface of the above-mentioned illumination lens to improve light distribution since such a measure increases loss of the illumination light quantity due to eclipse and total reflection by the first surface $r_1$ of the illumination lens.

For the reason described above, it has been impossible for the conventional illumination lens to attempt to obtain favorable light distribution at the marginal portion of the visual field and, at the same time, to effectively use the rays emerging from the light guide.

In the foregoing description, the rays are represented by the principal rays since intensities of the rays emerging from the individual optical fibers of the light guide are higher as they have smaller angles intersecting with the axis of the light guide.

In order to obtain favorable light distribution at the marginal portion of the visual field and minimize loss of the light quantity, it is necessary to use an illumination lens which is capable of directing, toward the range within the visual field, the rays which were directed outside the visual field and lost uselessly due to the eclipse and total reflection by the conventional illumination lens. For this purpose, it is sufficient to design the illumination optical system in such a manner that sin $A(h)$ has a maximum value at $h = h_0 0 < h_0 < r$), angle A has an adequate value corresponding to the field angle of the observation optical system and, within a range of $h_0 < h < r$, the value of sin $A(h)$ decreases as h increases. When the illumination optical system is designed in such a manner, since height of the principal ray is not increased so much on the first lens surface $r_1$ even at values of h larger than $h_0$, it possible to prevent the eclipse of the ray by the first lens surface and, since sin $A(h)$ is decreased at values of h larger than $h_0$, it is possible to improve the light distribution at the marginal portion of the visual field by leading the ray from the peripherical portion of the exiting surface, out of the rays emerging from the light guide, used almost in vain in the illumination optical system described as the conventional examples. Therefore, performance favorable in both the light distribution and light quantity can be obtained by using an illumination lens having d/dh{sin $A(h)$} < 0 in a range where h has a value larger than a certain degree. That is to say, it is sufficient that the height of ray h satisfying the above-mentioned condition (1) exists within a range of $0 \leq h \leq r$.

FIG. 5 shows graphs of sin $A(h)$ of the optical systems comprising the conventional illumination lenses having the above-described numerical data. FIG. 6 and FIG. 7 illustrate graphs of |sin $A(h)$| of embodiments of the present invention to be described later. Since some of the graphs illustrated in FIG. 6 and FIG. 7 have negative values of sin $A(h)$ at $h > 0.8$, the drawings show the curves not of sin $A(h)$ but of sin $|A(h)|$. As seen from these drawings, the above-mentioned curves of conventional optical systems monotonously rise as h increases and have d/dh {sin $A(h)$} > 0 ($0 \leq h \leq 1$), whereas the curves of the embodiments of the present invention have points of dh/d {sin $A(h)$} = 0 (h = $H_0$ and $0 < h_0 < 1$) and d/dh {sin $A(h)$} < 0 at $h > h_0$.

Since field angles of an observation optical systems are limited (generally narrower than 140°), a value of sin |sin $A(h)$| exceeding a certain value corresponding to the field angle means loss of light quantity. Therefore, it is evident that the illumination optical system according to the present invention assures smaller loss of light quantity than the conventional illumination optical systems.

In order to effectively utilize the rays emitted from the peripherical portion of the light guide, it is preferable that a portion satisfying the condition (1) exists within a range of $h \geq 0.4r$ and that sin $A \leq 0.6$ is satisfied at $h \geq 0.95$. Further, in order to illuminate the peripherical portion of the visual field with the rays emitted from inside the outermost circumference of the light guide, it is preferable that $h_o$ is smaller than 0.9r. In addition, a region having sin $A(h) < 0$ may exist at $h \leq 1$.

Now, descriptions will be made on the conditions (2) and (3). Recently, endoscopes having wide field angles of 90° to 150° are increasingly manufactured and, accordingly, it is necessary to widen angles of the illumination optical systems.

When an aspherical lens satisfying the condition (1) is used in the illumination optical system as described above, it is possible to properly balance light distribution at the marginal portion of the visual field with light quantity within the visual field, thereby making the illumination optical system more advantageous for an endoscope having a wider field angle.

In order to practically obtain an aspherical surface assuring uniform light distribution and little loss of light quantity, it is sufficient to design the aspherical surface so as to satisfy, in addition to the condition (1), the condition (2) defining that a maximum value of sin $A(h)$ is larger than 0.3 and the condition (3) defining that a partial area of the exiting surface of the light guide at which angle of refraction of the principal ray is smaller than 15° is narrower than 50% of the total area of the exiting surface of the light guide.

In the illumination optical system satisfying the condition (1), the light distribution to the marginal portion of the visual field is minaly performed by the lens portion having a maximum value of sin $A(h)$, and illumination at a wide angle is obtained by enlarging the maximum value. When illumination is performed directly with the light guide, light is distributed at an angle of about 60°. When the light guide is combined with an observation optical system having a field angle of about 80°, it is possible to sufficiently illuminate the marginal portion of the visual field when sin $A(h)$ has a maximum value larger than 0.3{$A(h) = 17.5°$}. However, when sin $A(h)$ has a maximum value smaller than 0.3, the light guide cannot sufficiently illuminate the marginal portion of the visual field of the endoscope having a field angle larger than 80° and is not suited for use with an endoscope having a wide field angle. That is to say, the illumination optical system must satisfy the condition (2). If sin $A(h)$ has two or more local maximum values, it is all right that the largest of the local maximum values satisfies the condition (2). FIG. 8 exemplifies a curve of sin $A(h)$ satisfying the condition (2).

The condition (3) is required for improving light distribution at the marginal portion of the visual field relatively by reducing light quantity around the center of the visual field in an illumination optical system for an endoscope having a wide field angle.

In illumination using an illumination optical system designed for use with an endoscope having a field angle of 80° or wider, it is conceived that the portion around the center of the visual field is illuminated with the rays having refraction angles smaller than 15°. Therefore, it is possible to obtain light distribution properly balanced between the central portion and marginal portion of the visual field by designing a light guide in such a manner that area S of the exiting surface thereof having A(h) smaller than 15° is narrower than 50% of the total area So of the exiting surface thereof. If the area S is larger than 50% of the area So, light quantity is increased at the portion around the center of the visual field and light distribution is relatively lowered at the marginal portion of the visual field, thereby making it impossible to widen angle of the illumination optical system.

FIG. 9 shows a drawing descriptive of the condition (3) for an illumination optical system wherein the exiting surface of the light guide is a circle having a redius of r and the illumination lens is axially symmetrical. On an assumption that $A(h_1) = A(h_2) = 15°$ as shown in the drawing, the condition (3) is expressed as follows:

$$r^2 + h_1^2 - h_2^2 < 0.5 r^2$$

As seen from the above description, the aspherical lens used in the illumination optical system according to the present invention has at least one of the first and second surfaces designed as an asperical surface having the shape expressed by the formula (a). This aspherical surface may be a concave surface, a convex surface or a surface having plural peaks. Further, this aspherical surface is characterized in that it satisfies the conditions (1), (2) and (3). An illumination optical system comprising the above-described aspherical lens can accomplish the object of the present invention.

It is impossible to determine the shape of the aspherical surface of the aspherical lens satisfying the conditions (1), (2) and (3) by an analytical method. However, it is possible to determine the shape in the procedures similar to those for determining the shape of an imaging lens having the ordinary spherical surface by using the ray tracing method with a computer. The shape of the aspherical surface of the aspherical lens to be adopted in the illumination optical system according to the present invention is not limited to a surface which is rotationally symmetrical around the x axis (optical axis). To eliminate the parallax in relation to the objective lens 4 as shown in FIG. 10, at least one surface may be made eccentric by $\delta$ or tilted relative to the optical axis. In that case, when the illumination lens system comprises a plural number of lens elements, it is possible to obtain the same effect as above by tilting the illumination lens system as a whole or at least one lens element thereof.

In case where a curved surface of the illumination lens system has a shape which is not rotationally symmetrical round the x axis as described in the above, it is all right as far as said curved surface has an aspherical shape expressed by the formula (a) in the state that the lens is sectioned along a plane containing the axis which passes approximately the center of one optical fiber in the light guide. When the lens having such an aspherical surface satisfies the conditions (1), (2) and (3), it is possible to obtain an illumination optical system which produces favorable light distribution and capable of accomplishing the object of the present invention. The cross-sectional shape of the illumination lens to be used in the illumination optical system according to the present invention may not be the curve expressed by the formula (a) but may be a polygonal line approximating the curve as shown in FIG.. 11. Further, the cross-sectional shape may be a combination of a short straight line and a curve approximating the above-mentioned curve.

When the curve is approximated by a polygonal line on the object side surface of the illumination lens, an object to be observed may be injured by the convexties formed at the folded portions. Therefore, a surface having the cross-sectional shape approximated by a polygonal line should desirably be adopted on the inside (on the side opposite to the object side).

Furthermore, it is possible to compose the illumination optical system according to the present invention by arranging an illumination lens system comprising two or more aspherical lenses in front of the light guide as shown in FIG. 13. In this case, it is all right that the conditions (1) and (2) apply to the rays having passed through the two or more aspherical lenses, and that the condition (3) applies to at least one aspherical surface. In addition, the term "aspherical surface" used in the present invention includes surfaces having cross-sectional shapes approximated by polygonal lines as shown in FIG. 11 and FIG. 12.

BRIEF DESCRIPTION OF THE DRAWINGS

FIG. 4 shows graphs illustrating the relations between the angle A and height of ray h in the conventional illumination optical systems;

FIG. 5 shows graphs illustrating relations between sin A and h of the conventional illumination optical systems;

FIG. 24 through FIG. 39 show sectional views and perspective views illustrating variants of the illumination optical system according to the present invention.

DETAILED DESCRIPTION OF THE PREFERRED EMBODIMENTS

Figure 1:
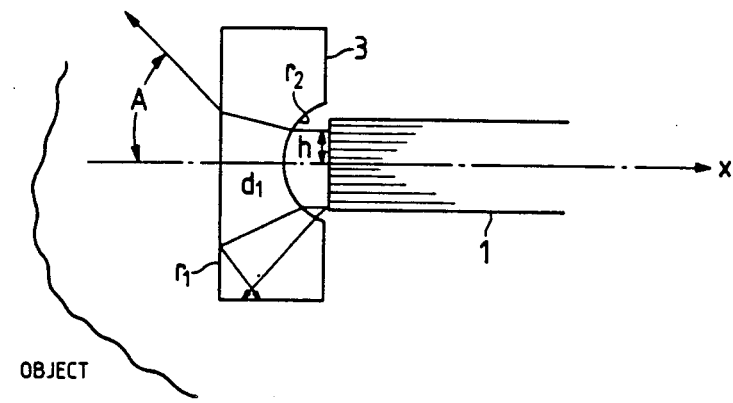
FIG. 1 shows a sectional view illustrating the composition of the conventional illumination optical systems for endoscopes.
Figure 2:
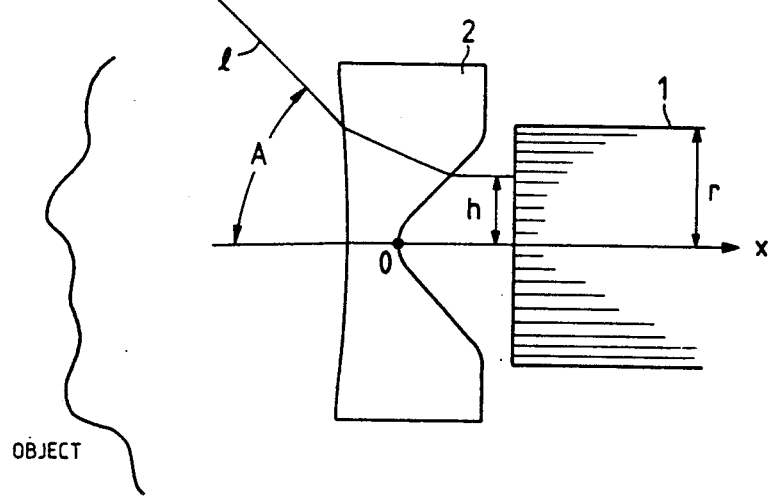
FIG. 2 shows a sectional view illustrating the composition of the illumination optical system for an endoscope according to the present invention.
Figure 3:
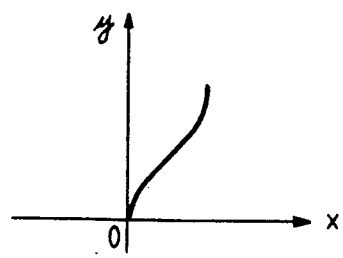
FIG. 3 shows a drawing illustrating the coordinate system for expressing the aspherical surface used in the present invention.

Now, preferred embodiments of the illumination optical system for an endoscope according to the present invention will be shown below.

The Embodiments 1 through 9 of the present invention use the illumination lenses illustrated in FIGS. 15 through 23 respectively and have the following numerical data:

Embodiment 1

$r_1 = -12.7273$
$d_1 = 0.4292$    $n_1 = 1.78472$    $\nu_1 = 25.71$
$r_2 = 0.2727$    (aspherical surface)
$d_2 = 0.6891$
aspherical coefficient
$P = -0.704,$    $B_6 = -0.17716$

Embodiment 2

$r_1 = -12.7279$
$d_1 = 0.3863$    $n_1 = 1.78472$    $\nu_1 = 25.71$
$r_2 = 0.2727$    (aspherical surface)
$d_2 = 0.7$
aspherical coefficient
$P = -0.6,$    $B_4 = -0.31623 \times 10^{-1}$
$B_6 = -0.18267$

Embodiment 3

$r_1 = -12.7273$
$d_1 = 0.4545$    $n_1 = 1.78472$    $\nu_1 = 25.71$
$r_2 = 0.2727$    (aspherical surface)
$d_2 = 0.7$
aspherical coefficient
$P = -0.6,$    $B_4 = -0.5324 \times 10^{-1}$
$B_6 = -0.16105$

Embodiment 4

$r_1 = -25.4545$
$d_1 = 0.4545$    $n_1 = 1.78472$    $\nu_1 = 25.71$
$r_2 = \infty$    (aspherical surface)
$d_2 = 0.7555$
aspherical coefficient
$P = 1,$    $B_2 = 0.4004$
$B_4 = 0.87676 \times 10,$    $B_6 = -0.33544 \times 10^2$
$B_8 = 0.61346 \times 10^2,$    $B_{10} = -0.61434 \times 10^2$
$B_{12} = 0.31895 \times 10^2,$    $B_{14} = -0.66912 \times 10$

Embodiment 5

$r_1 = \infty$
$d_1 = 0.4545$    $n_1 = 1.78472$    $\nu_1 = 25.71$
$r_2 = \infty$    (aspherical surface)
$d_2 = 0.7264$
aspherical coefficient
$P = 1,$    $B_2 = 0.10653 \times 10$
$B_4 = -0.51409,$    $B_6 = 0.10675 \times 10^2$
$B_8 = -0.43758 \times 10^2,$    $B_{10} = 0.71545 \times 10^2$
$B_{12} = -0.53031 \times 10^2,$    $B_{14} = 0.14701 \times 10^2$

Embodiment 6

$r_1 = -12.7273$
$d_1 = 0.4545$    $n_1 = 1.78472$    $\nu_1 = 25.71$
$r_2 = 0.2727$    (aspherical surface)
$d_2 = 0.6445$
aspherical coefficient
$P = -0.3,$    $B_4 = -0.1331$
$B_6 = -0.46705$

Embodiment 7

$r_1 = \infty$
$d_1 = 0.4545$    $n_1 = 1.78472$    $\nu_1 = 25.71$
$r_2 = \infty$    (aspherical surface)
$d_2 = 0.65$
aspherical coefficient
$P = 1,$    $B_2 = 0.17569 \times 10$
$B_4 = -0.13949 \times 10,$    $B_6 = 0.15589 \times 10$
$B_8 = -0.27066 \times 10,$    $B_{10} = 0.12793 \times 10$

Embodiment 8

$r_1 = 10$
$d_1 = 0.4545$    $n_1 = 1.78472$    $\nu_1 = 25.71$
$r_2 = \infty$    (aspherical surface)
$d_2 = 0.65$
aspherical coefficient
$P = 1,$    $B_2 = 0.17569 \times 10$
$B_4 = -0.13949 \times 10,$    $B_6 = 0.15589 \times 10$
$B_8 = -0.27066 \times 10,$    $B_{10} = 0.12793 \times 10$

Embodiment 9

$r_1 = 10$    (aspherical surface)
$d_1 = 0.4545$    $n_1 = 1.78472$    $\nu_1 = 25.71$
$r_2 = \infty$    (aspherical surface)
$d_2 = 0.65$
aspherical coefficient
$P = 0,$    $B_2 = 0.1,$    $B_4 = -0.05$
(second surface)
$P = 1,$    $B_2 = 0.17569 \times 10$
$B_4 = -0.13949 \times 10,$    $B_6 = 0.15589 \times 10$
$B_8 = -0.27066 \times 10,$    $B_{10} = 0.12793 \times 10$ In each of the Embodiments shown in the above, the reference symbols $r_1$ and $r_2$ represent radii of curvature of the first and second surfaces respectively of the illumination lens, the reference symbol $d_1$ designates thickness of the illumination lens, the reference symbol $d_2$ denote distance of the light guide as measured along the optical axis, the reference symbol $n_1$ represents refractive index of the illumination lens, and the reference symbol $\nu_1$ designates Abbe's number of the illumination lens. The numerical data shown above are normalized to the state of $r = 1$ where the reference symbol $r$ represents the radius of the exiting face of the light guide. The Embodiment 1 has the sectional shape shown in FIG. 15: the first surface designed as a weakly concave surface and the second surface designed as an aspherical surface having a sectional shape of a hyperbola modified by a coefficient of aspherical surface of the sixth order. A graph illustrating sin A of the Embodiment 1 is shown as curve a in FIG. 6.

The curve of sin A(h) is determined nearly by the aspherical surface expressed by the term of $$\frac{Cy^2}{\sqrt{1 - PC^2y^2}}$$

in the region where h has small values and, as h has larger values, mainly influenced by the aspherical surface expressed by the terms of $\Sigma B_i Y_i$, especially by the terms of the higher orders.

Figure 16:
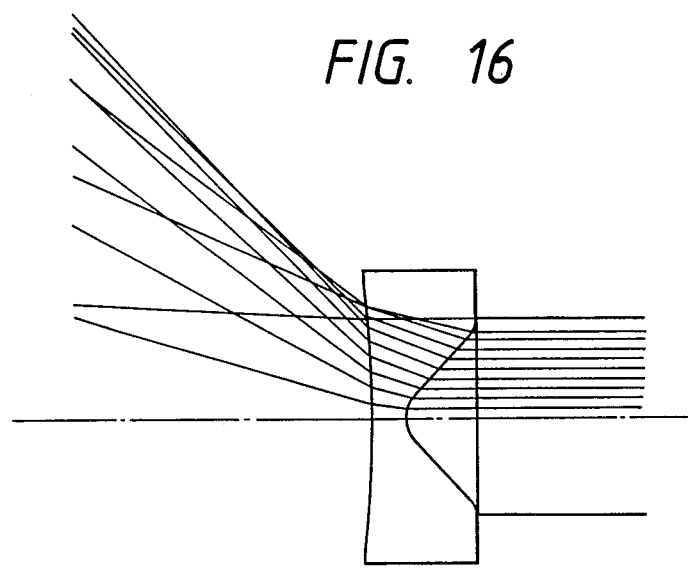

The Embodiment 2 has the sectional shape shown in FIG. 16: the second surface of the lens having a sectional shape of hyperbola modified by the coefficients of aspherical surface of the fourth and sixth orders. A graph illustrating sin A of the Embodiment 2 is shown as curve b in FIG. 6.

The lens described as the Embodiment 2 uses a hyperboloid as the curved surface of the second order like the Embodiment 1, and has a curve of sin A which is similar in its shape to that of the Embodiment 1 but deviated, by the difference of the value of the conic constant P, also in the region where h has small values.

Figure 6:
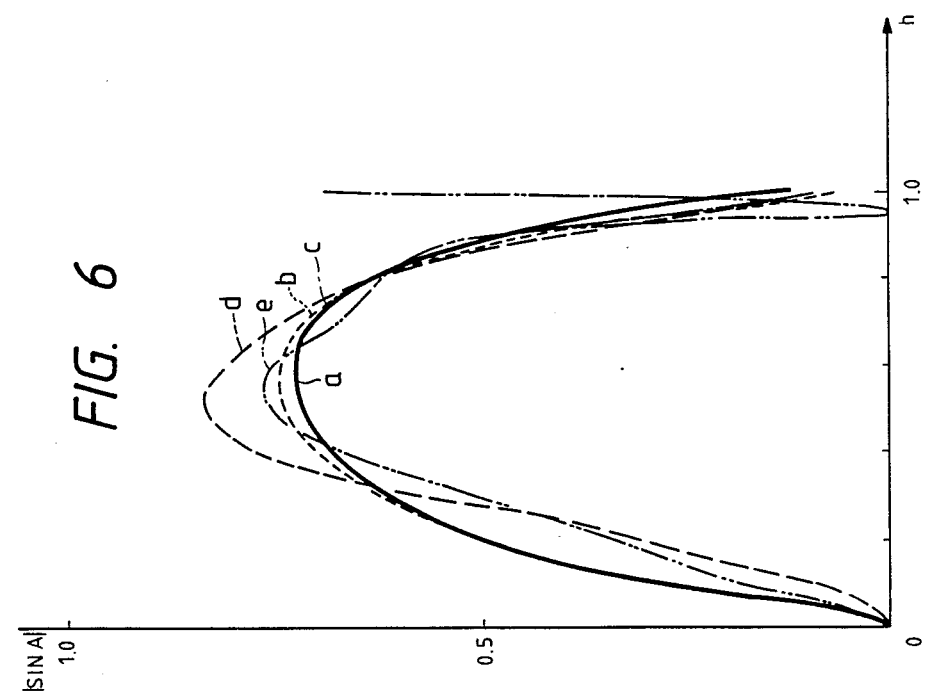
FIG. 6 shows graphs illustrating relations between sin A and h in embodiments 1 through 5 of the present invention.
Figure 8:
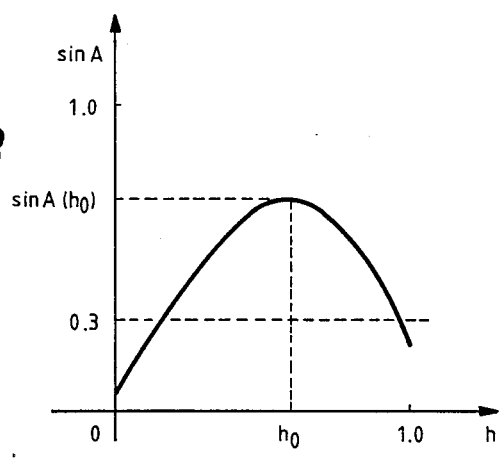
FIG. 8 shows a graph descriptive of the condition (2) of the present invention.
Figure 9:
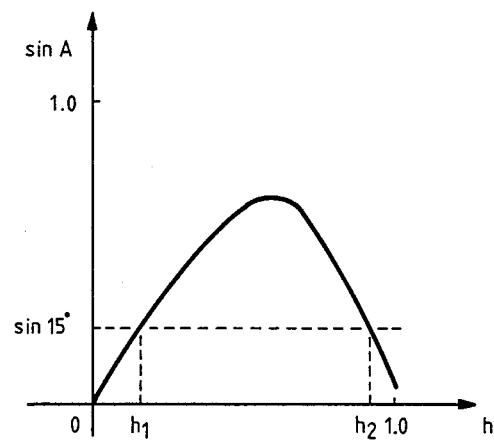
FIG. 9 shows a graph descriptive of the condition (3) of the present invention.
Figure 10:
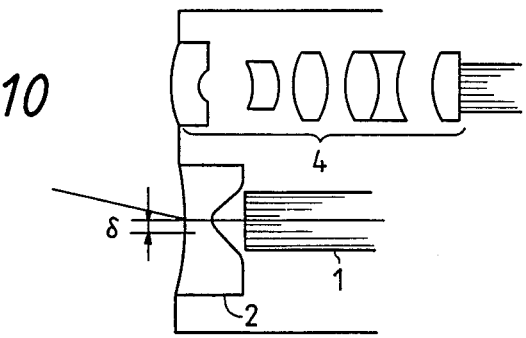
FIG. 10 shows a sectional view illustrating the composition of the illumination optical system according to the present invention in the state that the parallax thereof is corrected.
Figure 11:
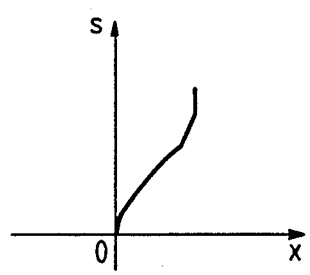
FIG. 11 and FIG. 12 show drawings illustrating other examples of the cross-sectional shape of the aspherical surface to be used in the present invention.
Figure 12:
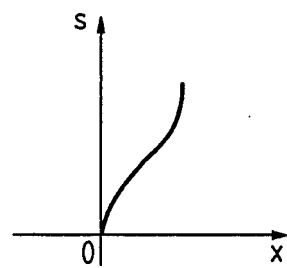
Figure 13:
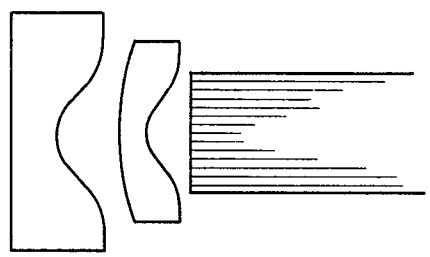
FIG. 13 shows a sectional view illustrating the composition of the illumination optical system according to the present invention wherein a plural number of aspherical lenses are used.
Figure 17:
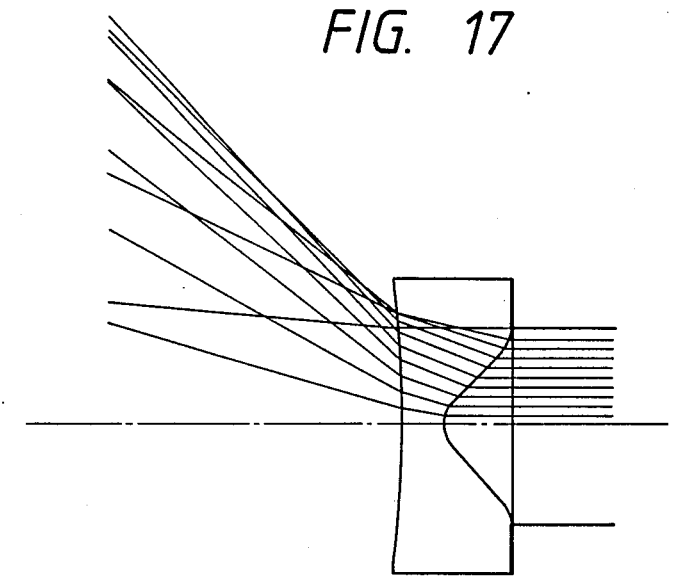

The Embodiment 3 has the sectional shape shown in FIG. 17 and the curve of sin A illustrated as the curve c in FIG. 6. The lens described as the Embodiment 3 is nearly the same as the Embodiment 2, but is different in the coefficients of aspherical surface of the fourth and sixth orders. Due to the differences in the coefficients of aspherical surface, the curve of sin A of the Embodiment 3 overlaps with that of the Embodiment 2 in the region where h has small values, but deviates in the region where h is larger than 0.7.

Figure 18:
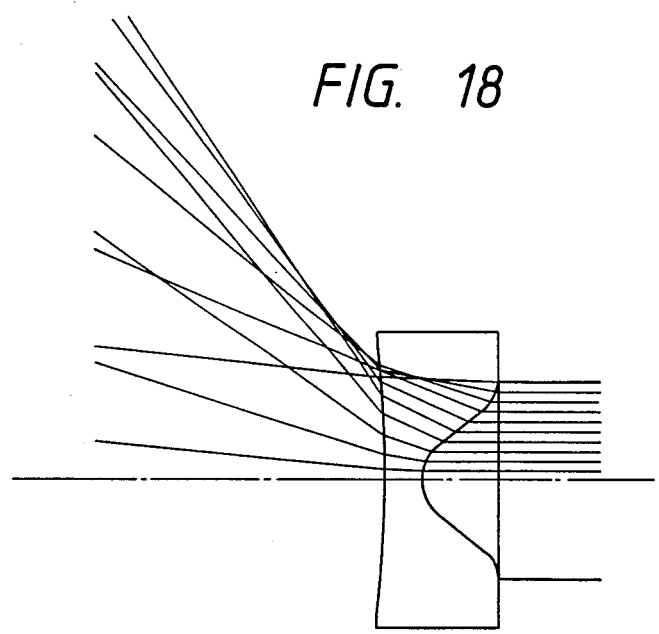

The Embodiment 4 has the sectional shape shown in FIG. 18 and the curve of sin A(h) shown as the curve d in FIG. 6. The aspherical surface of the Embodiment 4 uses a paraboloid as the curved surface of the second order and has a curve of sin A different in its shape from that of the lens using a hyperboloid as the aspherical surface also in the region where h has small values. The Embodiment 4 has a large maximum value of sin A(h) and is capable of illuminating at a wider angle. In each of the Embodiments 1 through 4 described above, the curve of sin A(h) has a maximum value in the vicinity of h=0.5 to 0.6. In the region where h has larger values, sin A(h) decreases and the value of dx/dy of the aspherical surface is nearly 0 at h=1, whereby the principal ray is not refracted substantially by the second surface designed as an aspherical surface and sin A(h) has a value close to 0. In case of an illumination lens having spherical surfaces, the principal ray emerging from the portion having h=1 is largely refracted by the second lens surface and advances in the diverging direction. Accordingly, the rays having large NA values are apt to be eclipsed by the peripherical surface of the lens and totally reflected at a high ratio due to a large angle of incidence on the first surface.

In the Embodiments 1 through 4 of the present invention, in contrast to the illumination lens having spherical surfaces, the principal ray emerging from the portion of h=1 advances straightly without being refracted substantially by the second lens surface and the rays having large NA values are scarecely eclipsed by the peripherical surface of the lens, and the angle of incidence on the first surface is small, whereby light quantity is scarecely lost due to the total reflection. Further, each of the Embodiments 1 through 4 is so designed as to have a maximum value of sin A(h) larger than 0.6 and S<0.5So, i.e., to satisfy the conditions (2) and (3).

In each of the Embodiments 1 through 4, the first lens surface is designed as a weakly spherical surface which allows the refractive power of the aspherical surface to be weakened to a certain degree, thereby lowering height of the rays on the first lens surface. The weakly concave surface a little contributes to suppress ununiform distribution of the light emerging from the light guide.

Figure 14A:
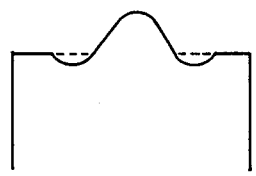
FIG. 14 shows sectional views illustrating aspherical metal molds to be used for pressing lenses.
Figure 14B:
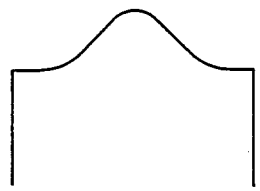
Figure 15:
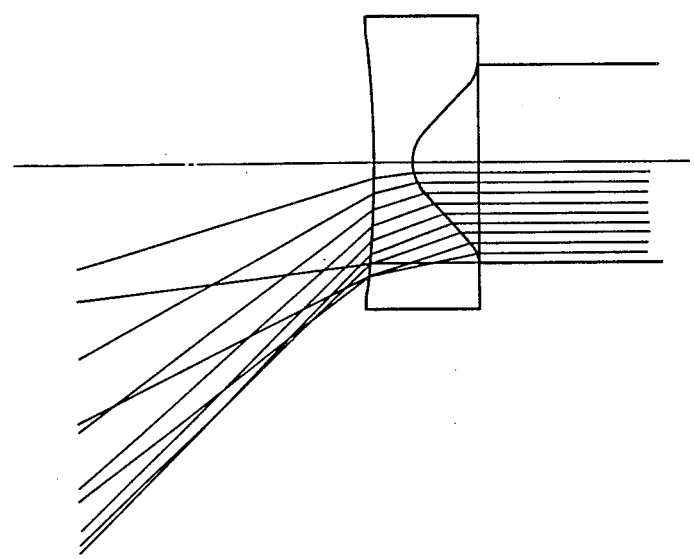
FIG. 15 through FIG. 23 show sectional views illustrating the Embodiments 1 through 9 of the present invention.

The illumination lenses having the aspherical surface used in these embodiments are manufactured mostly by working such as glass molding, glass pressing or plastic molding, and high precision metal dies are necessary for manufacturing. The metal dies are machined by forming axially symmetrical surfaces with drill edges applied to rotating materials. Concave surfaces cannot be formed by this method and a contrivance is necessary to manufacture such a metal die having a concavity as shown in (a) of FIG. 14.

In the Embodiments 1 through 4, dx/dy of the formula of aspherical surface is $ds/dy \geq 0$ within the range of the diameter of the light guide and the curve rises monotonously. When the surface outside the diameter of the light guide is made flat, the metal die has the surface with no concavity as shown in (b) of FIG. 14 and can easily be machined.

Figure 7:
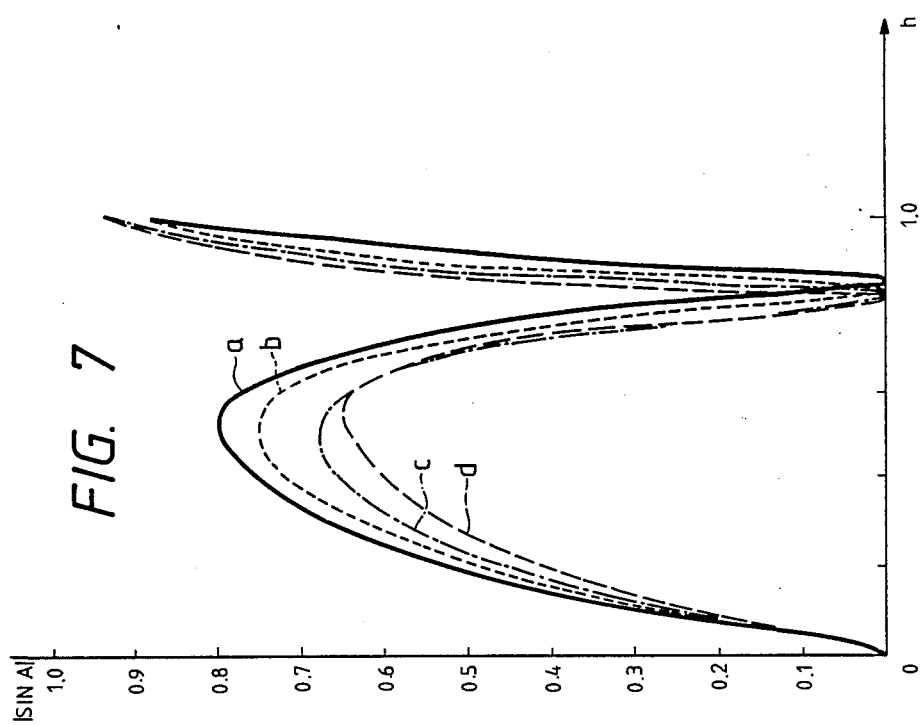
FIG. 7 shows graphs illustrating relations between sin A and h in embodiments 6 through 9 of the present invention.
Figure 19:
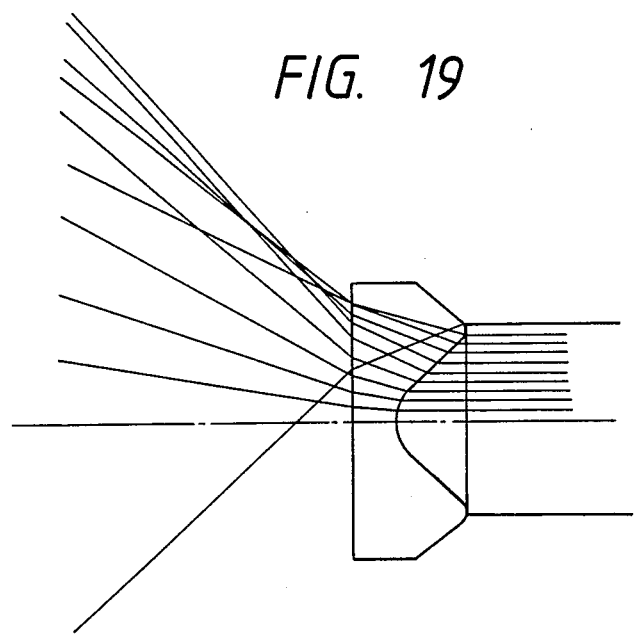
Figure 20:
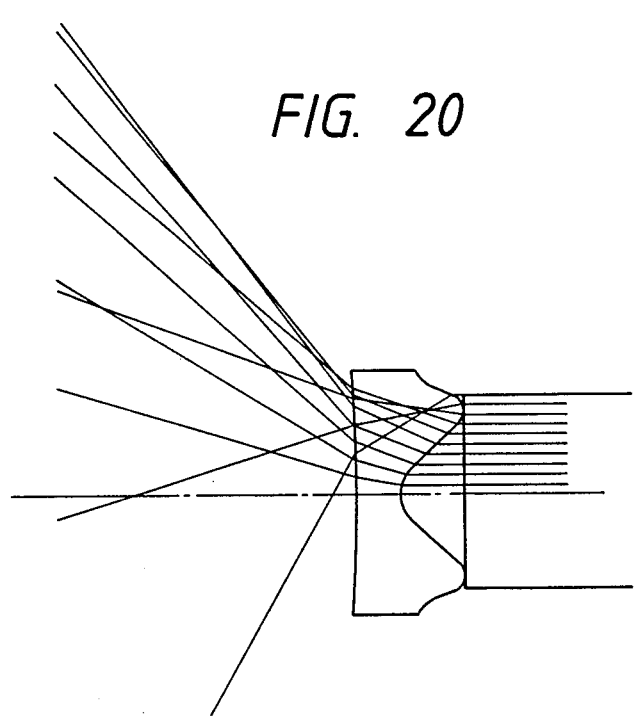
Figure 21:
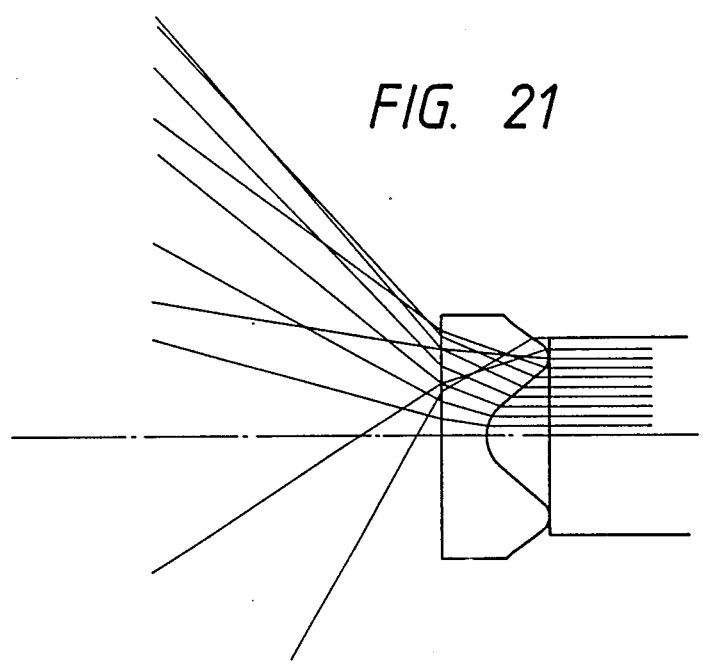
Figure 22:
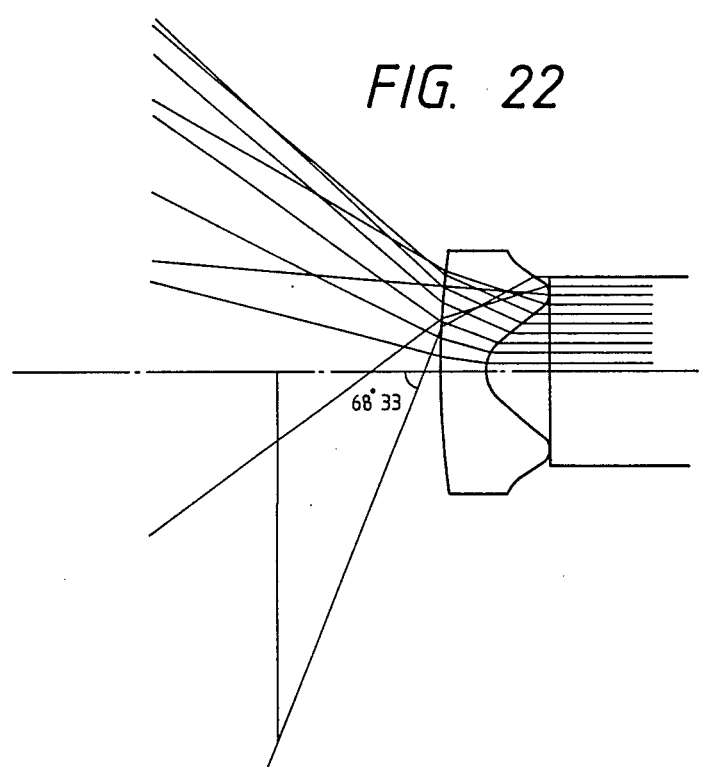
Figure 23:
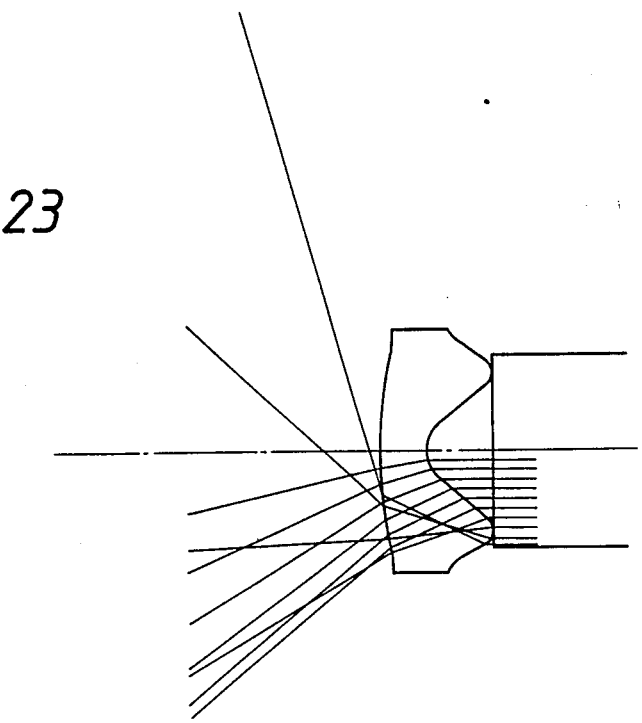

The Embodiment 5 has the sectional shape shown in FIG. 19 and the curve of sin A(h) shown as the curve e in FIG. 6. Since the aspherical surface of the illumination lens in the Embodiment 5 has a shape that dx/dy is smaller than 0 within a range of y<1 in the vicinity of Y=1, the illumination lens has a function like that of a convex lens for the principal ray emerging from the marginal portion of the light guide. Accordingly, the principal ray coming from the lens portion having h=1 emerges in the direction intersecting with the optical axis after passing through the illumination lens, thereby making sin A(h) smaller than 0. Therefore, heights of rays on the first lens surface are lower than those in any one of the Embodiments 1 through 4 and loss of light quantity due to eclipse is further minimized. Since the shape of the aspherical surface in the Embodiment 5 is so designed as to have a peak as sharp as possible at the point of the maximum value thereof, the curve of |sin A(h)| has a sharp peak at the point of the minimum value, thereby preventing light quantity from being increased only at the center of the visual field. In this embodiment, the portion of the end surface of the light guide corresponding to |sin A(h)| <0 has not so large an area. The illumination lens used in the Embodiment 5 has a first surface designed as a plane surface and can easily be manufactured. The Embodiments 6 through 9 have the sectional shapes shown in FIGS. 20 through 23 respectively. Curves of sin A(h) in these embodiments are shown as curves a, b, c and d respectively in FIG. 7.

In each of the Embodiments 6 through 9, the area of the end surface of the light guide corresponding to sin A(h)<0 is larger than that in the Embodiment 5, whereby the peripherical portion of the lens having the converging action is utilized more positively.

In the Embodiments 6, 7 and 8, the first lens surfaces are designed as a concave surface, a plane surface and a concave surface respectively, whereas the second lens surfaces are designed as aspherical surfaces convex at the peripherical portions thereof. In these embodiments balance between the portion having sin A(h)>0 and the portion having sin A(h) <0 is varied due to the differences in the shapes of the first lens surface, and balance of light distribution can be controlled by variation of the shapes of the first lens surfaces.

The Embodiment 9 has a first aspherical surface in addition to the second aspherical surface, thereby increasing flexibility of lens design and facilitating control of light distribution.

As is understood from the foregoing descriptions, the illumination optical system for an endoscope according to the present invention is applicable to an endoscope having a wide field angle and assures favorable light distribution at the marginal portion of the visual field with smaller loss of light quantity.

Figure 24:
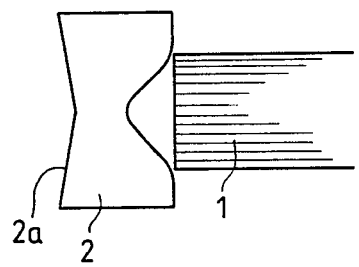

Though the illumination lenses used in the above-described embodiments are designed as plano-convex lenses, it is possible, for enlarging the diverging angle of the rays, to design the exiting surface 2a of the illumination lens 2 as a conical surface having a vertex on the optical axis as shown in FIG. 24. When such a design is adopted, illumination range is widened since the conical surface refracts rays in the directions farther apart from the optical axis than a plane surface.

Figure 25:
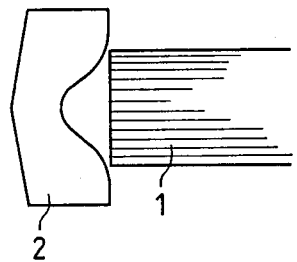
Figure 26:
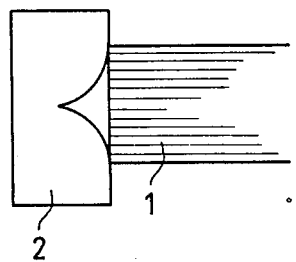

In order to prevent the diverging angle from being too large, in contrast, the exiting surface should be designed as a conical surface directed opposite, as shown in FIG. 25, to the conical surface shown in FIG. 24. The aspherical surfaces may be not only the smooth surfaces as described in the embodiments but also the surfaces having pointed centers as shown in FIG. 26.

Figure 27:
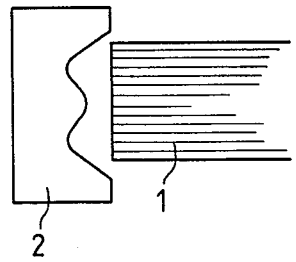
Figure 31:
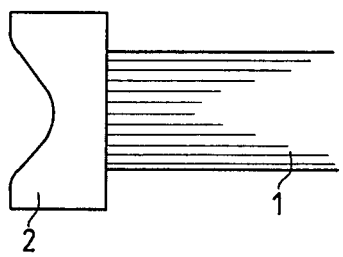

Further, the concave surfaces may be not only the simple concave surfaces described in the embodiments but also the surfaces having plural peaks and valleys alternately as shown in FIG. 27 and FIG. 28. Especially in case where the concave surface has the shape as shown in FIG. 28, the portions having d/dh (sin A)<0 periodically appear. When the concave surface is designed in the shape of Fresnel lens as shown in FIG. 29A, it is possible to make the illumination lens very thin as shown in FIG. 29B.

Especially in case of a video scope having a rectangular photographing surface, it is advantageous to design the illumination lens and light guide so as to have rectangular exiting surfaces for efficient illumination with smaller loss of light. FIG. 30A exemplifies an illumination system comprising an illumination lens and a light guide having rectangular exiting surfaces. In this case, the concave surface may have different sectional shapes in different directions. Speaking concretely, the rectangular surface has the sectional shape shown in FIG. 20C in the direction along the A—A' line and the sectional shape shown in FIG. 30D in the direction along the B—B' line.

Though all the embodiment described above have aspherical surfaces on the side of the light guides, it is possible to design the exiting surface as a concave surface.

Since an observation optical system and an illumination optical system are parallelly arranged in an endoscope, parallax is inevitably produced between these systems. In order to cancel deviation between an illumination field and visual field by solving the problem, it is effective to use the method described below.

Figure 32:
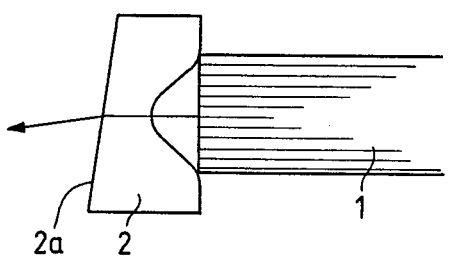

In the illumination system shown in FIG. 32, the front surface (exiting surface) 2a is inclined relative to the optical axis and the emerging light is refracted toward the bottom of the drawing. By arranging an observation system on the side of bottom of the drawing of the illumination system, the center of the illumination field is shifted toward the observation system, thereby reducing the parallax.

Figure 33A:
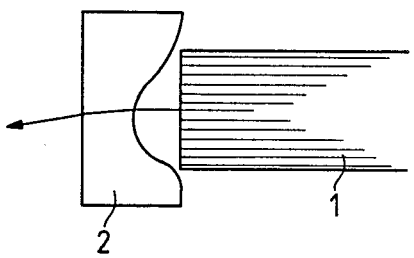
Figure 33B:
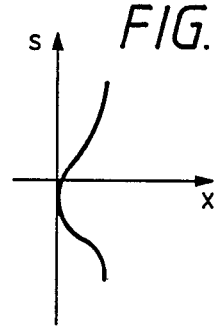
Figure 34A:
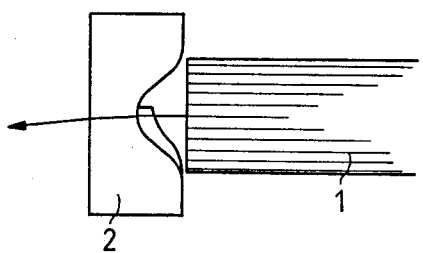
Figure 34B:
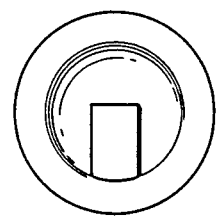
Figure 35:
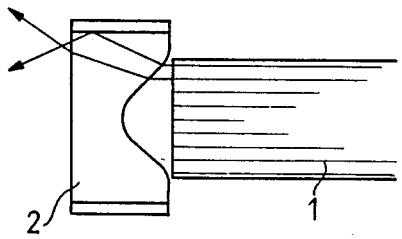
Figure 36:
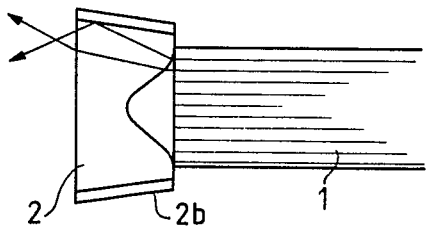
Figure 37:
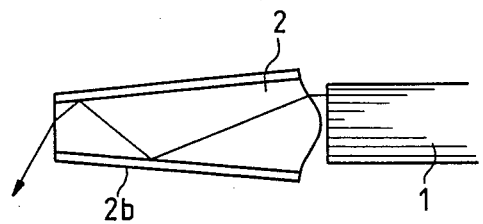

Further, when the aspherical surface is designed so as to have a sectional shape expressed by a formula including terms of odd orders and asymmetrical with regard to the optical axis, the refractive power of the aspherical surface is shifted on one side of the optical axis, whereby the concave surface has, as shown in FIG. 33A (sectional curve of the asphiercal surface is shown in FIG. 33B), the function similar to that of the lens system illustraed in FIG. 32 and serves for eliminating the parallax. Further, the similar effect is obtained when a composite aspherical surface like that of multi-focal lens by protruding a portion of the concave surface as shown in FIG. 34A and FIG. 34B, the latter illustrating a plan view of the lens as seen from the side of the aspherical surface. Further, it is possible to compose the illumination lens having an aspherical surface according to the present invention to be used in the illumination optical system of a single fiber shown in FIG. 35. In the case, loss of light quantity is minimized since rays are totally reflected by the boundary surface between the core and the cladding of the image fiber and directed toward and object to be observed. Furthermore, when the light guide is designed in a shape of a portion of a cone by inclining the side surface 2b of the single fiber as illustrated in FIG. 36 or FIG. 37, emerging angle of the rays is made wider or narrower than that obtained with the column-shaped light guide. It is possible to obtain an illumination optical system having desirable light distribution characteristic by utilizing the above-described design of the light guide.

Figure 38:
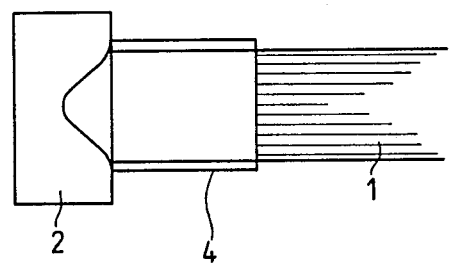

Moreover, it is possible to arrange a single fiber 4 between the illumination optical system 1 and a light guide fiber bundle 2 as shown in FIG. 38.

Figure 39:
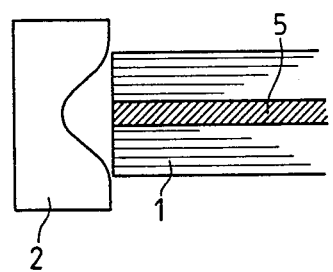

In case where the center of the illumination field is too bright, it is possible to minimize difference in light quantity between the center and marginal portion so as to facilitate observation by reducing quantity of the light emitted from the center of the light guide with an opaque rod-like member 5 embedded into the center of the light guide fiber bundle 1 as shown in FIG. 39.

In addition, it is possible to modify the emerging angle by designing the end surface of the light guide as a curved surface.

I claim:

1. An illumination optical system for an endoscope comprising a plane light source having spread in the direction perpendicular to the optical axis, and an illumination lens system arranged on the object side of said plane light source, comprising at least one aspherical surface and used for directing rays from said light source toward an object for illumination, said illumination optical system for an endoscope being so designed as to satisfy the following conditions (1) through (3):

(1) h satisfying d/dh {sin A(h)}<0 exists within a range of $0= \leq h \leq r$
(2) A relation of sin $A(h_o) \geq 0.3$ establishes for a certain value ho of h within a range of $0<h<r$ satisfying d/dh {sin $A(h_o)$}=0
(3) $S<0.5\ S_o$ wherein the reference symbol h represents height of incidence, on said illumination lens system, of the ray emitted from said light source in parallel to the optical axis, the reference symbol A(h) designates an angle formed between said ray and the optical axis when said ray emerges from said illumination lens, the reference symbol r denotes a distance as measured from the optical axis to the farthest point of said light source in the direction perpendicular to said optical axis, the reference symbol $h_0$ represents height of ray when sin A(h) has a maximum value (the largest of local maximum values when sin A(h) has plural local maximum values), the reference symbol $S_0$ designates the area of the light source and the reference symbol S denotes a partial area of the light source having $|A(h)| \leq 15°$.

2. An illumination optical system for endoscope comprising a light source having a light emitting surface across the optical axis, and an illuminating lens system arranged on the object side of said light source, comprising at least one aspherical surface and used for directing rays from said light source toward an object for illumination, said illumination optical system for an endoscope being so designed as to satisfy the following conditions (1) through (3):

(1) h satisfying d/dh {sin A(h)}<0 exists within a range of $0 \leq h \leq r$ (2) A relation of sin $A(h_o) \geq 0.3$ establishes for a certain value $h_o$ of h within a range of $0 < h < r$ satisfying d/dh {sin $A(h_o)$}=0

(3) $S < 0.5 S_o$ wherein the reference symbol h represents height of incidence, on said illumination lens system, of the ray emitted from said light source perpendicularly to said light emitting surface, the reference symbol A(h) designates an angle formed between said ray and the optical axis when said ray emerges from said illumination lens, the reference symbol r denotes a distance as measured from the optical axis to the farthest point of said light source in the direction perpendicular to said optical axis, the reference symbol $h_o$ represents height of ray when sin A(h) has a maximum value (the largest of local maximum values when sin A(h) has plural local maximum values), the reference symbol $S_o$ designates the area of said light emitting surface and the reference symbol S denotes a partial area of said light emitting surface having $|A(h)| \leq 15°$.

3. An illumination optical system for an endoscope according to claim 1 or 2 wherein the aspherical surface of said lens system is arranged eccentrically with regard to the optical axis.

4. An illumination optical system for an endoscope according to claim 1 or 2 wherein the aspherical surface of said lens system is inclined relative to the optical axis.

5. An illumination optical system for an endoscope according to claim 1 or 2 wherein said lens system comprises a plurality of aspherical lenses 6. An illumination optical system for an endoscope according to claim 1 or 2 wherein the aspherical surface of said lens system has the shape expressed by the following formula:

$$x = \frac{CS^2}{1 + \sqrt{1 - PC^2S^2}} + \sum_{i=1}^{n} B_i S^i$$

wherein C=1/R (wherein the reference symbol R represents radius of curvature on the vertex of the aspherical surface), the reference symbol S designates distance on the aspherical surface as measured from the optical axis, the reference symbol P denotes the conic constant, the reference symbol $B_i$ represents the coefficient of aspherical surface of i'th order.

7. An illumination optical system for an endoscope according to claim 1 or 2 wherein the section of the aspherical surface of said lens system has a shape of polygonal line consisting of plural short straight lines.

8. An illumination optical system according to claim 1 or 2 wherein said aspherical surface satisfies the following condition (4):

$$dx/dy \geq 0 \text{ in } 0 \leq y \leq r$$

9. An illumination optical system according to claim 1 or 2 including a lens having one surface which satisfied said conditions (1) through (3) and another surface which is conical.

10. An illumination optical system according to claim 1 or 2 wherein said aspherical surface has a pointed center.

11. An illumination optical system according to claim 1 or 2 wherein said aspherical surface is designed in a shape having a plurality of peaks and a plurality of valleys.

12. An illumination optical system according to claim 1 or 2 wherein said aspherical surface is designed in the shape of a Fresnel lens.

13. An illumination optical system according to claim 1 or 2 wherein said aspherical surface has sectional shapes different depending on directions of the planes including the optical axis thereof.

14. An illumination optical system according to claim 1 or 2 wherein said aspherical surface has a protruding portion.

15. An illumination optical system according to claim 1 or 2 wherein said illumination lens system includes a lens component having said aspherical surface and said lens component is composed of a single optical fiber.

16. An illumination optical system according to claim 15 wherein the said surface of said lens component composed of a single optical fiber is tapered.

17. An illumination optical system according to claim 1 or 2 wherein said light source is an exiting end surface of the light guide fiber bundle.

18. An illumination optical system according to claim 17 wherein a single optical fiber is arranged on the exiting end surface of said light guide fiber bundle.

19. An illumination optical system according to claim 17 wherein a light shielding member is centered at the exiting end surface of said light guide fiber bundle.

* * * * *